United States Patent [19]

Riesmeier et al.

[11] Patent Number: 5,730,195
[45] Date of Patent: Mar. 24, 1998

[54] MACHINING CENTER FOR THE MACHINING OF FLAT WORKPIECES

[75] Inventors: Wilhelm Riesmeier, Lübbecke; Heinz Kempkensteffen, Rietberg, both of Germany

[73] Assignee: IMA Maschinenfabriken Klessmann GmbH, Lubbecke, Germany

[21] Appl. No.: 637,714
[22] PCT Filed: Oct. 26, 1994
[86] PCT No.: PCT/EP94/03518
   § 371 Date: Jul. 19, 1996
   § 102(e) Date: Jul. 19, 1996
[87] PCT Pub. No.: WO95/12479
   PCT Pub. Date: May 11, 1996

[30] Foreign Application Priority Data

Nov. 5, 1993 [DE] Germany ............... 43 37 739.4

[51] Int. Cl.⁶ .................. B27C 5/00; B27C 1/00; B25B 11/00
[52] U.S. Cl. ............. 144/134.1; 144/48.1; 144/114.1; 144/242.1; 144/2.1; 269/21; 269/289 R; 409/189; 409/219; 409/903
[58] Field of Search .......... 83/451, 930; 269/21, 269/289 R; 409/189, 190, 191, 192, 216, 219, 201, 903; 144/1.1, 2.1, 3.1, 48.1, 114.1, 134.1, 252.1

[56] References Cited

U.S. PATENT DOCUMENTS

| 4,313,478 | 2/1982 | Suzuki | 144/48.1 |
| 4,949,942 | 8/1990 | Shoda | 144/48.1 |
| 5,094,282 | 3/1992 | Suzuki et al. | 144/3.1 X |
| 5,323,821 | 6/1994 | Suzuki | 144/48.1 |

Primary Examiner—W. Donald Bray
Attorney, Agent, or Firm—Charles E. Baxley, Esq.

[57] ABSTRACT

An apparatus for machining workpieces includes a feed conveyor which has an alignment station and a discharge conveyor which adjoin a machining zone. Between the feed conveyor and the discharge conveyor, there is a transport device which is disposed at one side of the machining field and which has displaceable work holders which grasp the workpieces at one of their edges. The transport device receives the workpieces at the alignment station at the end of the feed conveyor, conveys them at substantially the same level to the machining station in the machining zone, transfers them there to vacuum work holders on a work rest, and then transports them, after the machining, to the discharge conveyor.

8 Claims, 1 Drawing Sheet

MACHINING CENTER FOR THE MACHINING OF FLAT WORKPIECES

FIELD OF THE INVENTION

The present invention relates to a machining apparatus for machining of flat workpieces of wood or woodlike material having a machining zone with one or more machining stations. The machining apparatus has at least one work rest having vacuum work holders which can be adjusted in the direction of a longitudinal coordinate (X-axis) and a transverse coordinate (Y-axis). The machining apparatus has a machining unit with a tool spindle which can be moved above a machining field relative to the X-axis as well as the Y-axis.

BACKGROUND OF THE INVENTION

Machining apparatuses according to the prior art which have a program-controlled machining unit, for the machining of flat workpieces, which include furniture parts or elements for interior decoration, can be used to machine the top side and the peripheral sides of the workpieces. The workpieces can, for instance, be milled along their periphery in order to impart to them a given peripheral contour, or they can be provided with holes or cutouts. The holding of the work on a work rest remains a problem in prior art machining apparatuses because the work rest must not be damaged during machining processes. The workpieces must be capable of being positioned on the work rest, the work rest itself must be capable of being positioned in the machining zone, freely in the direction of the X-axis and the Y-axis. Up to now, in known machining apparatuses, the workpieces were placed by hand on the work rest at the machining station and positioned there and they had to be removed from the work rest by hand after the machining.

It is not practical to clamp the workpieces on a conveyor means which moves cyclically through the machining zone, such as a conveyor chain, which is halted with a corresponding workpiece at the machining station during an individual machining process because the individual workpieces cannot be machined free of interference at those places which are supported by the conveyor means. In particular, when machining peripheral edges of a workpieces in prior art machining apparatuses, a collision between the machining tool and the conveyor means could not be prevented.

From Germany Patent 41 01 904 A1, a numerically controlled upper milling cutter is known which has a machining field with vacuum work holders for the workpieces. For the loading and clearing of the machining zone, a large number of conveyor devices linked to each other are provided, which have robots, feed and discharge conveyors, direction-change conveyors and synchronizing conveyors. For these conveyor systems an expensive control is necessary in order to transport the workpieces in each case in correct position and arrange them in correct position on the machining zone.

OBJECT AND SUMMARY OF INVENTION

It is a prime object of the present invention to provide a machining apparatus in which the loading of a work rest with workpieces at the location of the machining field and the further conveying of the workpieces after machining can be accomplished mechanically.

The foregoing and other objects and advantages of the present invention will appear more clearly hereinafter.

In accordance with the present invention, a machining apparatus includes a feed conveyor which has an alignment station and a discharge conveyer which adjoins a machining zone. Between the feed conveyor and the discharge conveyor, there is a transport device which is disposed at one side of the machining zone and which has displaceable work holders which grasp the workpieces at one of their edges.

This transport device receives the workpieces at the alignment station at the end of the feed conveyor, conveys them at substantially the same level to the machining station or to several machining stations in the machining zone, transfers them there to vacuum work holders on a work rest, and from there transports them after the machining to the discharge conveyor.

The workpieces pass in synchronism through the machining zone of the machining apparatus. The mechanical operation of the work rest permits an exact positioning of the workpieces with respect to the machining unit and the one-sided arrangement of the transport device with the work holders on the machining zone makes collision-free machining possible.

In particular, the work holders of the transport device can, after the workpieces have been taken over by the vacuum work holders of the work rest, be moved entirely out of the machining zone or field, so that they do not interfere with the machining of the edges of the workpieces.

The feed conveyor, as well as the discharge conveyor in the regions directly adjoining the machining zone and the transport device have the same direction of conveyance, whereby a linear transport of the workpieces results in the region of the machining apparatus.

It is of particular advantage if the transport device of the invention has two groups of work holders, one group being movable between an alignment station at the end of the feed conveyor and the machining zone and the second group being movable between the machining zone and the discharge conveyor. Thus, the first group of work holders, after the placing of the workpiece on the work rest at the machining zone, can move back to the alignment station in order to receive the next workpiece there, while the preceding workpiece is being machined. In the same way, the second group of work holders of the transport device can move during the machining of the workpiece into that position on the machining zone in which the workpiece which is being machined at the time is taken over for further transport to the discharge conveyor, since sufficient holding of the workpieces after the positioning on the work rest of the machining field is assured by the vacuum work holders of the work rest.

The work rest can have an additional function which is particularly advantageous for workpieces which are long and heavy and which protrude from the peripheral place of attach of the work holders of the transport device in the direction of the Y-axis. The work rest can, for this purpose, consist of two or more supports which bear the vacuum work holders and can be moved in X-direction parallel to the transport device. At least one of these supports is then controlled in such a manner that, upon the taking over of a workpiece at the alignment station, it moves towards the feed conveyor and supports the workpiece in the return travel towards the machining zone. In principle, the entire work rest can be used for such a supporting of the workpieces during the transport to the machining zone, in which case also a relative displacement of the workpieces to the transport device can be provided, as long as the vacuum work holders of the work rest have not fastened the corresponding workpiece. In the same way at least one of the movable supports of the work rest can also travel along in the direction towards the discharge conveyor upon the transfer of a workpiece from the machining field to the discharge conveyor in order to support the workpiece in question.

In accordance with a further development of the invention, the alignment station has a longitudinal guide bar (X-direction) parallel to the transport device, and a transverse rail (Y-direction) perpendicular to the transport device against which the workpieces are placed by the feed conveyor. In order to transport the workpiece free of collision towards the machining field, the transverse rail can be moved away from a datum to further position the workpiece which can take place as soon as the aligned workpiece has been grasped by the work holders of the transport device at the alignment station.

In order to take up the workpiece at its aligned longitudinal edge at the alignment station by the work holders of the transport device, the lengthwise guide bar is advantageously arranged on the side of the alignment station on which the transport device is located. In order to prevent a collision between the longitudinal guide bar and the work holders of the transport device, the lengthwise guide rod is moved out of the operating range of the work holders before the workpiece is grasped.

For transport of flat workpieces there are particularly suitable roller tables and feed conveyors. Such a roller table is provided in the region of the alignment station with rollers which are so inclined in their plane of conveyance relative to the direction of conveyance so that the workpieces are imparted a transverse component of feed towards the longitudinal guide bar. In this regard, the inclination of the cylindrical rollers refers to the longitudinal guide bar, to the stop plane of which the axes of the rollers are not perpendicular but are at an angle of less than 90° C., as seen in the direction of conveyance.

BRIEF DESCRIPTION OF THE DRAWING

The present invention will be further explained below on basis of an embodiment with reference to the drawing.

DETAILED DESCRIPTION OF THE INVENTION

Figure 1:
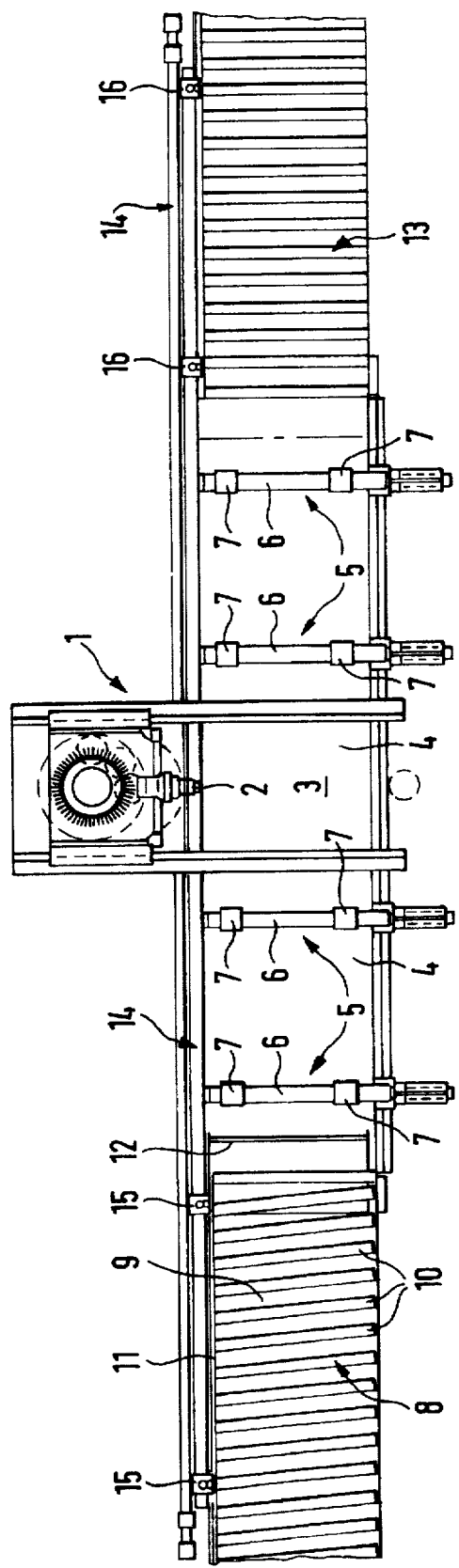
FIG. 1 is a diagrammatic plan view of a machining center for the machining of flat workpieces according to the present invention.

With reference to the drawing, wherein like reference numbers designate like or corresponding parts throughout, there is shown a machining unit 1 having a tool spindle 2 which has a tool rest (not shown in detail) for machining tools such as milling cutters, drills and eccentrically operating tools such as saws or the like. The tool spindle 2 is displaceable in the direction of several axes within a machining space 3, the machining space 3 being limited towards the bottom by a machining zone 4 with work rests 5. The tool spindle 2 can be moved both in a lengthwise direction, the X-direction, and in a transverse direction, the Y-direction, as well as perpendicular to the elongated rectangular machining zone 4. In addition, the tool spindle 2 can be seated on a swingable spindle head in order, for instance, to assume a vertical position or a horizontal position.

The work rest 5 is formed by several supports 6 which have on their top sides vacuum work holders 7 which are aligned on their top sides at the same level with each other to receive flat workpieces. The supports 6 are individually movable perpendicular to their lengthwise direction, namely in X-direction, and can be so adjusted that collision between the vacuum work holders 7 and the tool in the tool spindle 2 is not possible during the machining processes.

For this purpose, the vacuum work holders 7 can be positioned in Y-direction on the supports 6. One or more workpieces can be arranged on the work rest 5, depending from the work holders 7 and/or the supports 6; in corresponding manner, the machining field 4 may include one or more machining stations.

Work rest 5 on the machining zone 4 is operated automatically. Machining zone 4 has a feed side and a discharge side. Adjoining the feed side, at the same height as the work rest 5 and the vacuum work holders 7 of the supports 6, there is a feed conveyor 8 in the form of a roller table which feeds an alignment station 9 for the workpieces. Along one side of the alignment station 9 there is a lengthwise guide bar 11 above the rollers 10 of the feed conveyor 8 against which guide bar 11 one side of the flat workpieces are applied. The rollers 10 are inclined in the region of the alignment station 9 of the feed conveyor 8 with their axes lying in a horizontal place in each case inclined relative to the lengthwise guide bar 11. The angle of inclination is somewhat less than 90° C. and is open in the direction of conveyance. Furthermore, at the end of the alignment station 9 towards the machining zone 4 there is a transverse rail 12 in the vicinity of the conveyance path of feed conveyor 8 on which rail the workpieces align themselves with a second edge which is at right angles to the first edge which rests against the lengthwise guide bar 11. The transverse rail 12 can be moved out of the path of conveyance of the workpieces so that they can travel from the alignment station 9 of the feed conveyor 8 onto the machining zone 4.

On the outlet side of the machining zone 4 there is a discharge conveyor 13 to which the workpieces which have been machined are transported. The conveying of the workpieces from the alignment station of the feed conveyor 8 to the machining zone 4 of the machine and from there to the discharge conveyor 3 is effected by a transport device 14 which is arranged on the rear of the machining zone 4 along which the machining unit 1 is also guided. The transport device 14 extends linearly from the alignment station 9 of the feed conveyor 8, past the machining zone 4, up to the discharge conveyor 13 and can be developed in one strand or two strands.

In the embodiment shown, the transport device 14 consists of two strands and has a first group of work holders 15 as well as a second group of work holders 16 consisting of holding clamps or the like, which grasp the flat workpieces at the edges facing them so as to carry them along in their direction of conveyance. Thus, the work holders 15 can be moved from the alignment station 9 of the feed conveyor 8 up to the machining zone 4 while the second work holders 16 can be moved between the machining zone 4 and the discharge conveyor 13. The first group 15 of these work holders grips the corresponding aligned workpiece at the alignment station 9 of the feed conveyor 8 and conveys it in this aligned position to the machining zone 4 where it is taken over by the vacuum work holders 7 of the work rest 5 at the corresponding machining station in the region of the longer machining zone 4. In the case of long workpieces which protrude a large distance from the work holders 15, the transport from the alignment station 9 to the machining station can be supported by the supports 6 of the work rest 5 in the manner that the supports 6, which are displaceable in the direction of passage through the machine, are moved to the alignment station 9 and then brought together with the workpiece up to the position on the machining station of the machining zone 4 which is necessary for the machining process. During the machining, the workpieces are held fixed on the work rest 5 by the vacuum work holders 7 so that the alignment in position by the work holders 15 of the transport device 14 is no longer required. These work holders 15, after the taking over of the workpiece by the vacuum work holders 7, move back to the alignment station 9 in order to receive the next workpiece there.

In the reverse sequence of movements, the removal of the machined workpiece is effected from the machining station of the machining zone 4 to the discharge conveyor 13 by the second work holders 16 of the transport device 14. These work holders grip the workpiece in question at the machining place and possibly with the assistance of supports 6 of the work rest 5 which travel along with it, bring it to the discharge conveyor 13.

The foregoing specific embodiments of the present invention as set forth in the specification herein are for illustrative purposes only. Various deviations and modifications may be made within the spirit and scope of this invention, without departing from the main theme thereof.

We claim:

1. A machining apparatus for the machining of flat workpieces having a machining zone with said machining zone defined by a pair of sides, with at least one machining station, which has at least one workrest with a plurality of vacuum work holders for gripping said workpieces, which can be adjusted in the direction of a lengthwise coordinate, X-axis, and of a transverse coordinate, Y-axis, of said machining zone and having a machining unit with a tool spindle which is movable above said machining zone in the direction of several axes, including the X-axis as well as the Y-axis comprising:

a feed conveyor, with said feed conveyor disposed adjoining said machining zone and at the height of said work rest;

an alignment station with said alignment station disposed on said feed conveyor;

a discharge conveyor with said discharge conveyor disposed adjacent said machining zone;

transport means with said transport means disposed along one side of said machining zone and with said transport means disposed between said feed conveyor and said discharge conveyor;

a plurality of displaceable work holder means, with said displaceable work holder means disposed on said transport means, with said displaceable work holders capable of being moved to said alignment station, with said displaceable work holder means capable of gripping said workpieces when said workpieces are at said alignment station and conveying said workpieces to said machining zone and allowing said vacuum work holders of said work rest to grip said workpieces during operation of said machining unit and then moving said workpieces to said discharge conveyor after machining.

2. A machining apparatus according to claim 1, in which said feed conveyor comprises a feed conveyor portion disposed directly adjoining said machining zone with said feed conveyor portion aligned for conveyance along said X-axis and in which said discharge conveyor comprises a discharge conveyor portion disposed directly adjoining said machining zone with said discharge conveyor portion aligned for conveyance along said X-axis.

3. A machining apparatus according to claim 1, in which said plurality of displaceable work holders comprises a first group of work holders and a second group of work holders with said first group of work holders movable between said alignment station and said machining field, and with said second group of work holders movable between said machining field and said discharge conveyor.

4. A machining apparatus according to claim 1, further comprising a plurality of movable support means mounted on said work rest, with said support means capable of moving in the direction of the X-axis, parallel to said transport means, with said support means supporting said work holders, and with at least one of said support means capable of supporting said workpieces during travel to said machining zone.

5. A machining apparatus according to claim 4, with at least one of said support means capable of supporting said workpieces during travel in the direction towards said discharge conveyor.

6. A machining apparatus according to claim 1, in which said alignment station comprises:

a guide bar with said guide bar disposed parallel to said transport means, movable traverse rail means with said traverse rail means disposed perpendicular to said guide bar, with said traverse rail means extending across said feed conveyor for abutment against said workpieces and with said traverse rail means being capable of being moved away from said feed conveyor for further transport of said workpieces to said machining field.

7. A machining apparatus according to claim 6, in which said guide bar is disposed along a side of said transport means.

8. A machining apparatus according to claim 6, in which said feed conveyor comprises:

a plurality of roller means with said roller means inclined with respect to said guide bar, to impart a transverse component to conveyance to said workpieces, thereby directing said workpieces toward said guide bar.

* * * * *